United States Patent
Aiyar et al.

(10) Patent No.: US 9,824,059 B2
(45) Date of Patent: Nov. 21, 2017

(54) CHILD SERIAL DEVICE DISCOVERY PROTOCOL

(71) Applicant: Microsoft Technology Licensing, LLC, Redmond, WA (US)

(72) Inventors: Arvind Aiyar, Kirkland, WA (US); Vivek Gupta, Bothell, WA (US); George Evangelos Roussos, Seattle, WA (US); Robbie Harris, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 14/474,084

(22) Filed: Aug. 30, 2014

(65) Prior Publication Data

US 2016/0062942 A1 Mar. 3, 2016

(51) Int. Cl.
*G06F 13/40* (2006.01)
*G06F 13/42* (2006.01)
*G06F 13/38* (2006.01)

(52) U.S. Cl.
CPC ........ *G06F 13/4286* (2013.01); *G06F 13/385* (2013.01); *G06F 13/4081* (2013.01); *G06F 13/4282* (2013.01)

(58) Field of Classification Search
CPC . G06F 13/4286; G06F 13/4081; G06F 13/385
USPC ...................................... 710/8, 10, 301, 302
See application file for complete search history.

(56) References Cited

U.S. PATENT DOCUMENTS

| | | | |
|---|---|---|---|
| 6,009,480 A | 12/1999 | Pleso | |
| 6,336,151 B1 | 1/2002 | Seki | |
| 6,704,824 B1 | 3/2004 | Goodman | |
| 7,437,738 B2 | 10/2008 | Shah et al. | |
| 7,600,227 B2 | 10/2009 | Brockway et al. | |
| 8,086,781 B2 | 12/2011 | Ananny et al. | |
| 8,225,015 B2 | 7/2012 | Gao-Saari et al. | |
| 8,260,978 B1* | 9/2012 | Thompson | G06F 9/4413 710/10 |
| 8,346,977 B2 | 1/2013 | Zeng et al. | |
| 8,626,959 B2 | 1/2014 | Ruzek et al. | |
| 2006/0218321 A1 | 9/2006 | Hotta et al. | |
| 2006/0268329 A1 | 11/2006 | Lo | |
| 2008/0088634 A1* | 4/2008 | Thompson | G09G 5/00 345/520 |

(Continued)

FOREIGN PATENT DOCUMENTS

WO 2007137415 A1 12/2007

OTHER PUBLICATIONS

"International Search Report and Written Opinion Issued in PCT Patent Application No. PCT/US2015/047309", dated Nov. 3, 2015, 10 Pages.

(Continued)

*Primary Examiner* — Glenn A Auve (74) *Attorney, Agent, or Firm* — Arent Fox LLP (57) ABSTRACT

In one example, a host device may identify a serial device connected to the host device to determine a host action. The host device may receive a serial device signal with a child serial device identifier from a serial device bridge. The host device may identify a child serial device based on the child serial device identifier. The host device may execute a host action based on the child serial device.

20 Claims, 9 Drawing Sheets

(56) References Cited

U.S. PATENT DOCUMENTS

| | | | |
|---|---|---|---|
| 2008/0276012 A1* | 11/2008 | Mesa | G06F 13/102 |
| | | | 710/13 |
| 2010/0174834 A1* | 7/2010 | Lowe | G06F 8/60 |
| | | | 710/14 |
| 2011/0149341 A1* | 6/2011 | Ko | G06F 3/1204 |
| | | | 358/1.15 |
| 2011/0289518 A1 | 11/2011 | Li et al. | |
| 2012/0054372 A1* | 3/2012 | Chen | G06F 9/4415 |
| | | | 710/13 |
| 2013/0132614 A1 | 5/2013 | Bajpai et al. | |
| 2013/0138859 A1 | 5/2013 | Vecera et al. | |

OTHER PUBLICATIONS

"Universal Serial Bus Specification Revision 2.0", Retrieved from <<http://sdphca.ucsd.edu/Lab_Equip_Manuals/usb_20.pdf>>, Apr. 27, 2000, 650 Pages.

"Audio Endpoint Devices", Retrieved at:<<http://msdn.microsoft.com/en-us/library/windows/desktop/dd370793%28v=vs.85%29.aspx>>, Oct. 31, 2011, 2 Pages.

"Plug and Play External COM Device Specification", Retrieved at:<<http://www.nondot.org/sabre/os/files/PlugNPlay/PNP-ExternalSerial-v1.00.pdf>>, Feb. 28, 1995, 26 Pages.

"International Preliminary Report on Patentability Issued in PCT Application No. PCT/US2015/047309", dated Oct. 6, 2016, 5 Pages.

* cited by examiner

CHILD SERIAL DEVICE DISCOVERY PROTOCOL

BACKGROUND

A serial device is a peripheral device that may connect to a computing device via a serial port. A serial port is a physical interface that may receive data in a serial communication. Serial communication transfers data on a bit by bit basis. Examples of a serial device may include a mouse, a keyboard, or a printer.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to a host device identifying a serial device connected to the host device to determine a host action. The host device may receive a serial device signal with a child serial device identifier from a serial device bridge, and may identify a child serial device based on the child serial device identifier. The host device then may execute a host action based on the child serial device.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a serial device host system.

A host system may seek to discover a serial device connected to a host computer over a serial port, such as, for example, a three dimensional printer. By identifying the serial device, a host computer may install relevant device drivers for the serial device and alert appropriate applications. Traditionally, a serial device may have very limited avenues for self-identification, preventing compatible applications and drivers form interacting with the serial device. A serial device may use a serial device bridge to overcome those limitations by connecting to the host device over a universal serial bus port. A serial device bridge is a device that converts serial device signals from the serial device into a format usable by the port connecting the serial device bridge to the host device. The operating system of the host device may query a serial device bridge to identify whether any children serial devices are present, so that the proper drivers may be installed if not already present. The operating system then may identify that child serial device so a relevant driver may be found and installed.

Traditionally, a host device may use a serial device self-identification protocol to identify a serial input device directly connected to the host device. An example of a serial device self-identification protocol may be a plug and play protocol, referred to as "PnP Com". The serial device self-identification protocol may be augmented by removing redundant or unnecessary steps and by expanding the descriptor format to include serial devices developed after the establishment of the protocol. The serial device may self-identify using the augmented serial device self-identification protocol. The serial device bridge may encapsulate a transmission from the serial device that uses the serial device self-identification protocol.

Alternately, the serial device bridge may identify the attached child serial device and alert the host device. The serial device bridge may identify the attached child serial device. For a simpler serial device bridge, a user may load the type of child serial device into a bridge data storage on the serial device bridge for later retrieval by the host device.

Thus, in one example, a host device may identify a serial device connected to the host device to determine a host action. The host device may receive a serial device signal with a child serial device identifier from a serial device bridge. Alternately, the host device may receive a serial device signal encoded by a serial device with a serial device identifier in a serial device self-identification protocol. The host device may execute a reception phase of a serial device self-identification protocol as a single device read pass. The host device may identify a child serial device based on the child serial device identifier. The host device may execute a host action based on the child serial device.

Figure 1:
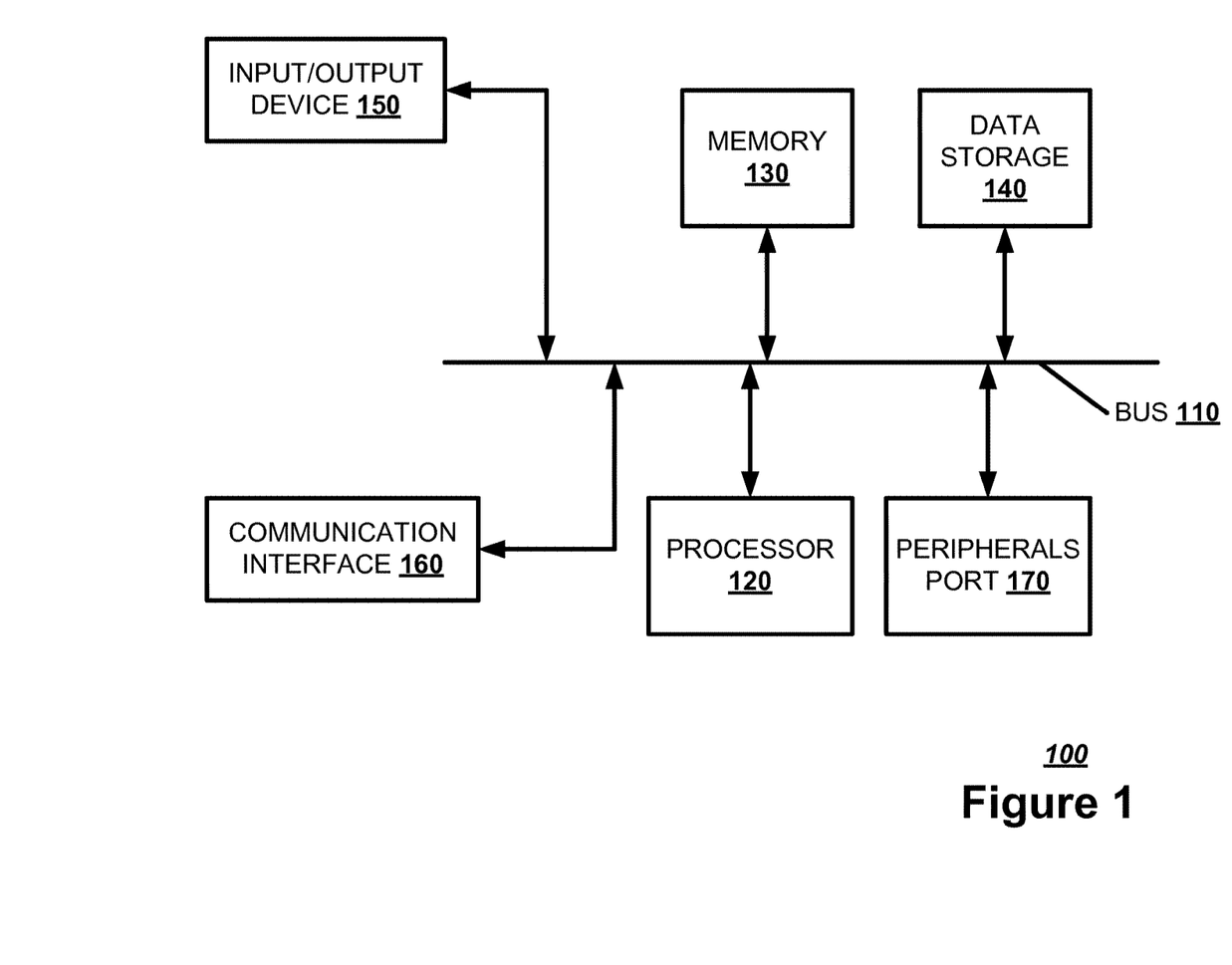
FIG. 1 illustrates, in a block diagram, an exemplary computing device.

FIG. 1 illustrates a block diagram of an exemplary computing device 100 which may act as a host device. The computing device 100 may combine one or more of hardware, software, firmware, and system-on-a-chip technology to implement a host device. The computing device 100 may include a bus 110, a processor 120, a memory 130, a data storage 140, an input/output device 150, a communication interface 160, and a peripherals port 170. The bus 110, or other component interconnection, may permit communication among the components of the computing device 100.

The processor 120 may be part of a processing system and include one or more conventional processors or microprocessors that interprets and executes a set of instructions. The memory 130 may be a random access memory (RAM) or another type of dynamic data storage that stores information and instructions for execution by the processor 120. The memory 130 also may store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media, as described herein, is distinguishable from having instructions propagated or transmitted, as the propagation transfers the instructions, versus stores the instructions, such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that, when executed by one or more processors, cause the one or more processors to perform the method. The data storage 140 also may be a database or a database interface for storing serial device descriptors in an expanded descriptor format.

The input/output device 150 may include one or more conventional mechanisms that permit a user to input information to the computing device 100, such as a keyboard, a mouse, a voice recognition device, a microphone, a headset, a gesture recognition device, a touch screen, or the like. The input/output device 150 may include one or more conventional mechanisms that output information to the user, including a display, a printer, one or more speakers, a headset, or a medium, such as a memory, a magnetic or optical disk and a corresponding disk drive, or the like. The communication interface 160 may include any transceiver-like mechanism that enables computing device 100 to communicate with other devices or networks. The communication interface 160 may include a network interface or a transceiver interface. The communication interface 160 may be a wireless, wired, or optical interface. The peripherals port 170 may connect the client device to a peripheral device to allow the peripheral device to communicate with the client device.

The computing device 100 may perform such functions in response to the processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

Figure 2:
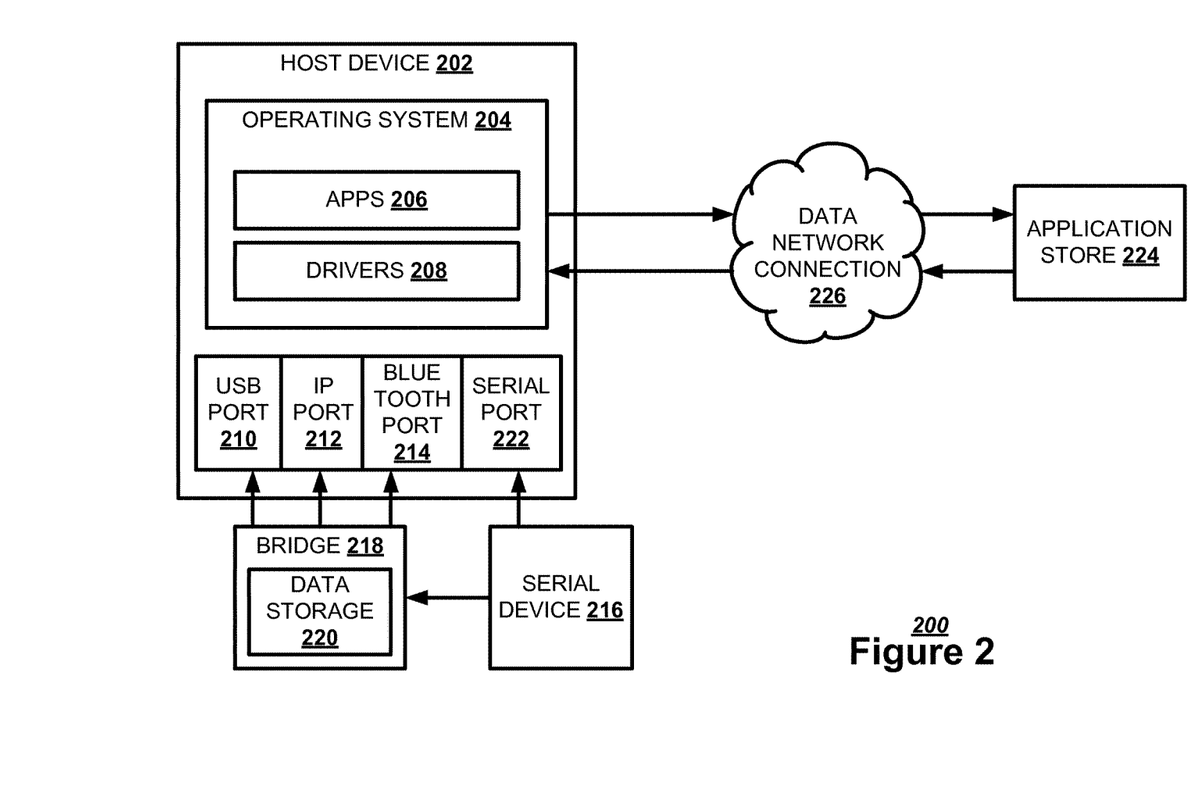
FIG. 2 illustrates, in a block diagram, an exemplary local network.

FIG. 2 illustrates, in a block diagram, an exemplary local network 200. A host device 202, or serial device host system, may implement an operating system 204 to execute a set of one or more applications 206 or drivers 208. An operating system 204 may use the driver 208 to communicate with the peripheral port 170 of the host device 202. The peripheral port 170 may be a serial port or a non-serial port, such as a universal serial bus (USB) port 210, an internet protocol port 212, a Bluetooth® port 214, or the like. The universal serial bus port 210 allows a device to communicate using the universal serial bus standard. The internet protocol port 212 allows a device to communicate using internet protocol. The Bluetooth® port 214 allows a device to communicate using a Bluetooth wireless communication standard. A serial device 216 may connect to the host device 202 via the peripheral port 170. If the peripheral port 170 is a non-serial port, the serial device 216 may connect to the non-peripheral port via a serial device bridge 218. The serial device 216 connected via the serial device bridge 218 may be referred to as a child serial device 216. The serial device bridge 218 may have a bridge data storage 220 that stores a child serial device identifier to identify the child serial device 216. Alternately, the serial device 216 may be connected to the host device 202 via a serial port 222. The serial device 216 connected via the serial port 222 may be referred to as an in-band serial device.

Once the operating system 204 identifies the serial device 216, the operating system 214 may use that information to select an appropriate application 206 or driver 208 to interact with the serial device 216. Additionally, the operating system 204 may connect to an application store 224 via a data network connection 226. The application store 224 may have a set of applications 206 and drivers 208 available for download by the host device 202. The data network connection 226 may be an internet connection, a wide area network connection, a local area network connection, or any other type of data network connection. The host device 202 may receive a set of applications from the application store 224 for download by the host device 202. The operating system 204 may filter the application set presented by the application store 224 based on the identity of the child serial device 216.

Figure 3:
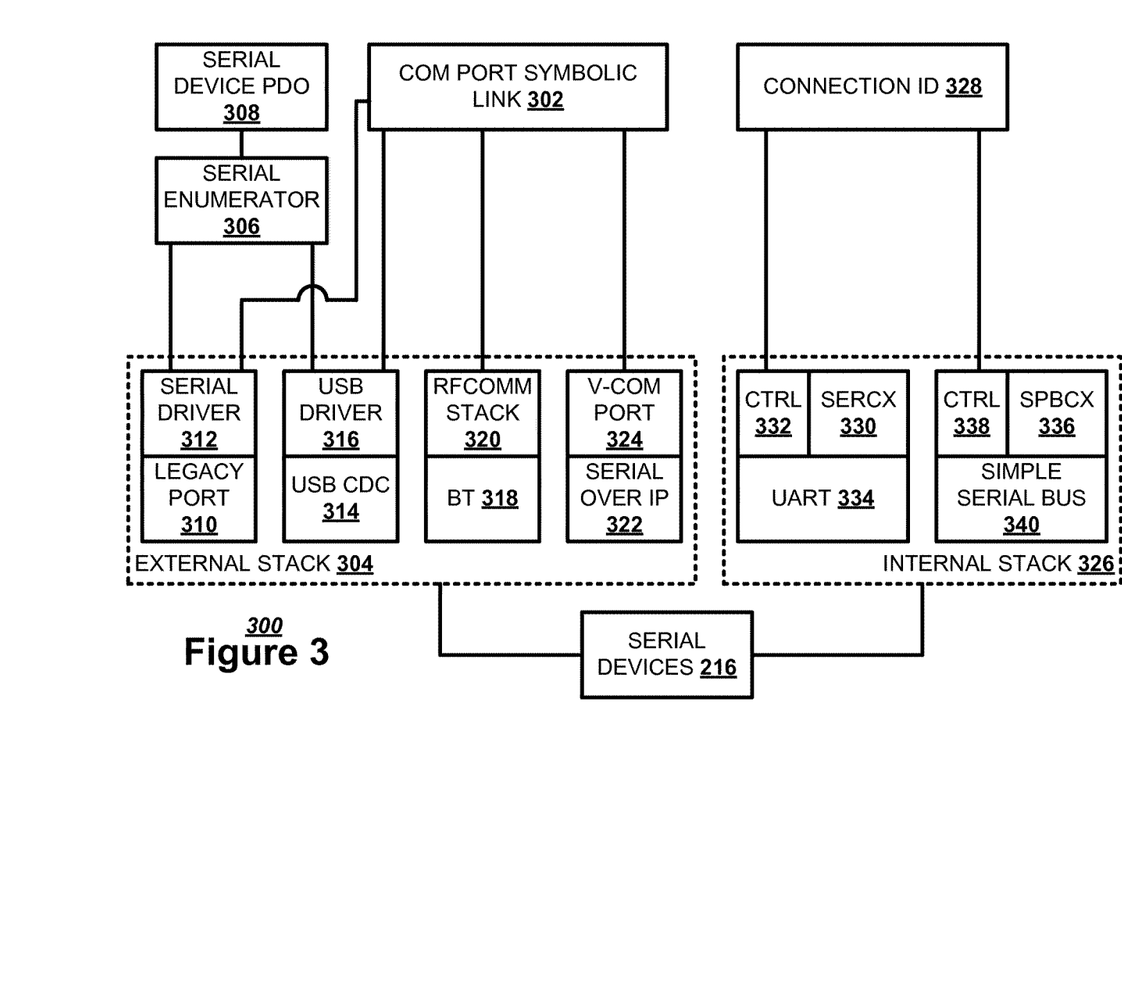
FIG. 3 illustrates, in a block diagram, an exemplary system architecture of a host device.

FIG. 3 illustrates, in a block diagram, an exemplary system architecture 300 of the host device 202. The host device 202 may operate the application 206 in the user space. The application 206 may identify an external serial device 216 in a kernel space using a communication port acting as a symbolic link 302 presented by an external device stack 304. Additionally, a serial enumerator 306 may act as an upper device filter that enumerates any child serial devices connected to a serial port controlled by a legacy serial driver or a universal serial bus serial driver. The serial enumerator 306 may act as a bus driver by creating a physical data object (PDO) 308 upon receiving a query device relations input/output request packet. If a new device has been detected, the serial enumerator 306 reports that as a child device in the query device relations, carrying out the responsibilities of the bus driver. The serial enumerator 306 may detect device arrival and departure. The serial enumerator 306 may omit handling the input/output actions, instead passing the input/output actions received on the child physical data object 308 down to the parent external device stack 304.

In the external device stack 304, a legacy communication port 310 may use a system supplied serial driver 312 to act as a function driver or a lower filter driver for devices using a 16550 universal asynchronous receiver/transmitter compatible interface. A universal serial bus communication device class 314 may use a universal serial bus serial driver 316 to communicate with a serial device over a universal serial bus and expose a communication port acting as the symbolic link 302. A Bluetooth® (BT) serial port 318 may use a radio frequency communication (RFCOMM) stack 320 to expose a serial port profile over the communication port acting as the symbolic link 302. A serial over internet protocol port 322 may use a communication port virtualizer (V-COM Port) 324 to bridge a transport protocol, such as internet protocol or transmission control protocol, and a serial port.

The serial device 216 may communicate via an internal device stack 326 that provides a connection identifier 328 to applications operating in the user space. In the internal device stack 326, a serial communication framework extension 330 may support a serial controller driver 332 compatible with a 16550 or 16550 compatible universal asynchronous receiver transmitter 334. The serial port supported by this internal device stack may connect to an off-chip peripheral serial device 216. These peripheral serial devices 216 may reside inside the case of the host device 202, possibly on the same board as a system on a chip. The serial communication framework extension 330 may use direct memory access.

Similarly, a shortest path bridging framework extension 336 may allow controller drivers 338 to control system on a chip peripherals that connect over simple serial buses 340, such as an inter-integrated circuit bus, a serial peripheral interface bus, or other shared buses that use a simple 3-4 wire serial protocol for communication. These integrated serial devices 216 may be statically enumerated. Also, rather than using a communication port acting as the symbolic link 302, the internal device stack 326 may use an abstract connection identifier 328 to hide the underlying connection parameters. The actual serial device 216 and connections may be exposed to the application 206 in the user space as a set of resources that can be retrieved by peripheral drivers.

If the serial device 216 is connected to the host device 202 via a serial device bridge 218, the serial device bridge 218 may identify the serial device 216 to the host device 202. If the serial device 216 is directly connected to the host device 202, the serial device 216 may use a serial device self-identification protocol to identify the serial device 216 to the host device 202, such as PnP Com. The serial device 216 may encode a device signal according to a transmission phase of the serial device self-identification protocol. The host device 202 may decode the device signal according to a reception phase of the serial device self-identification protocol.

Figure 4:
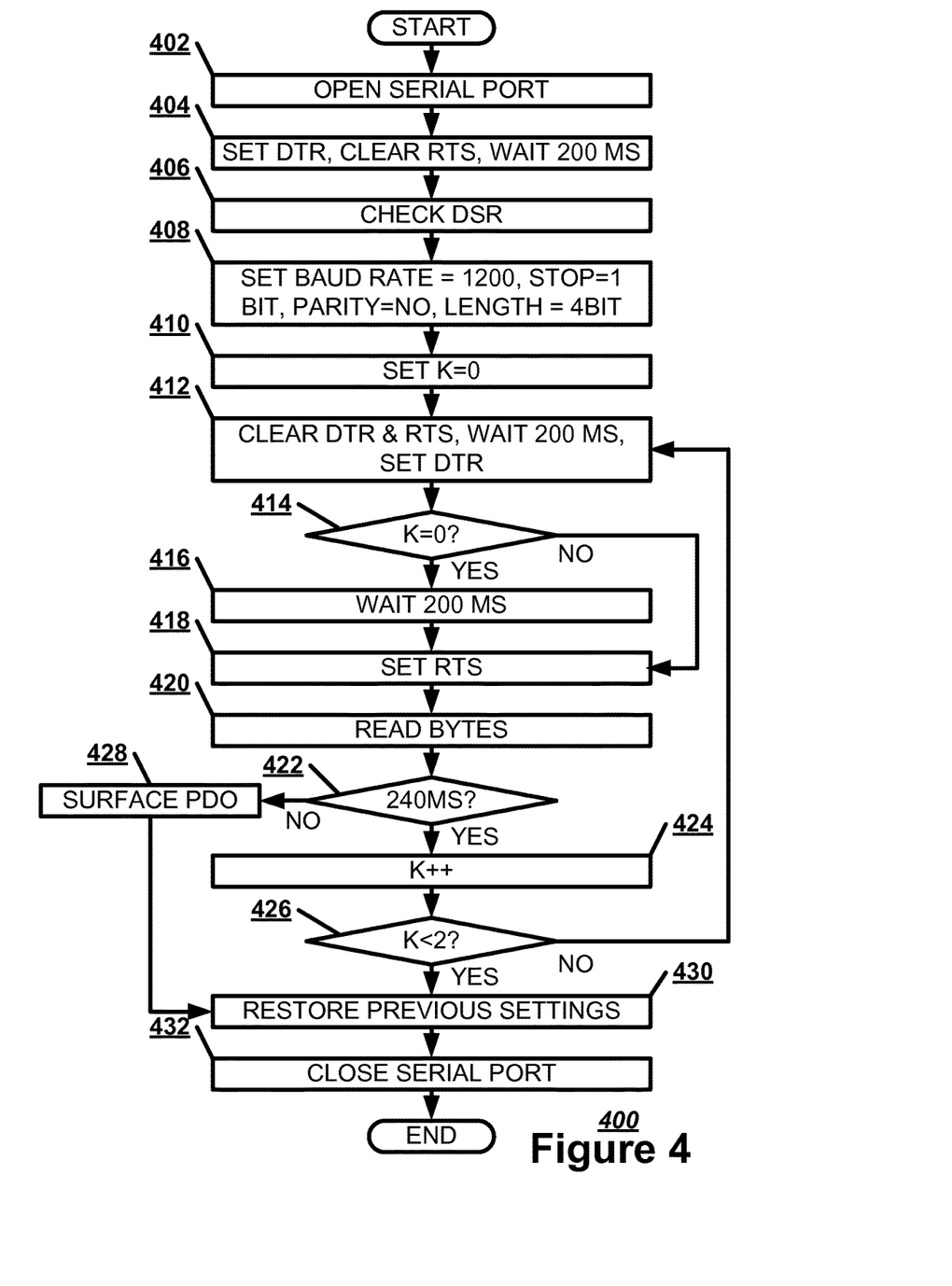
FIG. 4 illustrates, in a flowchart, an exemplary method of implementing a serial device self-identification protocol.

FIG. 4 illustrates, in a flowchart, an exemplary method 400 of implementing the reception phase of the serial device self-identification protocol. A serial enumerator, such as the serial enumerator 306, may open a serial port, such as the serial port 222 (Block 402). The serial enumerator may set the Data Terminal Ready (DTR) signal, clear the Request To Send (RTS) signal, and then wait for a protocol-designated wait period, such as 200 ms (Block 404). The serial enumerator may check the Data Set Ready (DSR) signal (Block 406). If the Data Set Ready signal is not set, the serial enumerator does not quit as the serial device 216 may be a mouse. The serial enumerator may set the baud rate to a protocol-designated communication rate, such as 1200; the stop to 1 bit; the parity bit to no parity; and the word length to a protocol-designated word length, such as 7 bits (Block 408). The serial enumerator may set an index variable k to 0 (Block 410). The serial enumerator may clear the Data Terminal Ready signal and Request To Send signal, wait the protocol-designated wait period, and set the Data Terminal Ready signal (Block 412). If k=0, indicating a first device read pass (Block 414), the serial enumerator may wait the protocol-designated wait period (Block 416). The serial enumerator may set the Ready To Send signal (Block 418). The serial enumerator may start reading the bytes from the serial port one at a time (Block 420). If the serial enumerator reaches a protocol designated time-out period, such as 240 ms, without reading an identifier (Block 422), the serial enumerator may increment the index variable k indicating the number of device read passes that have occurred (Block 424). If the serial enumerator has performed less than two passes (Block 426), the serial enumerator may perform a second pass. If the serial enumerator reads the string as an identifier prior to timing out (Block 422), the serial enumerator may surface the identifier of a physical data object (Block 428). The serial enumerator may restore the serial port to the previous settings (Block 430). The serial enumerator may close the serial port (Block 432).

The serial device self-identification protocol may be augmented by making several adjustments to the reception phase to reduce the number of actions taken. The host device 202 may omit one or more of the wait periods from the reception phase of the serial device self-identification protocol. The host device 202 may reduce the number of device read passes in the reception phase of the serial device self-identification protocol to a single device read pass. The descriptor format of the serial device self-identification protocol may be expanded beyond the current device descriptions to describe types of devices developed after the protocol has been established. For example, currently, a first byte read as "M" may describe a mouse or other input devices. An expanded descriptor format may describe other serial devices besides these pre-established devices.

Figure 5:
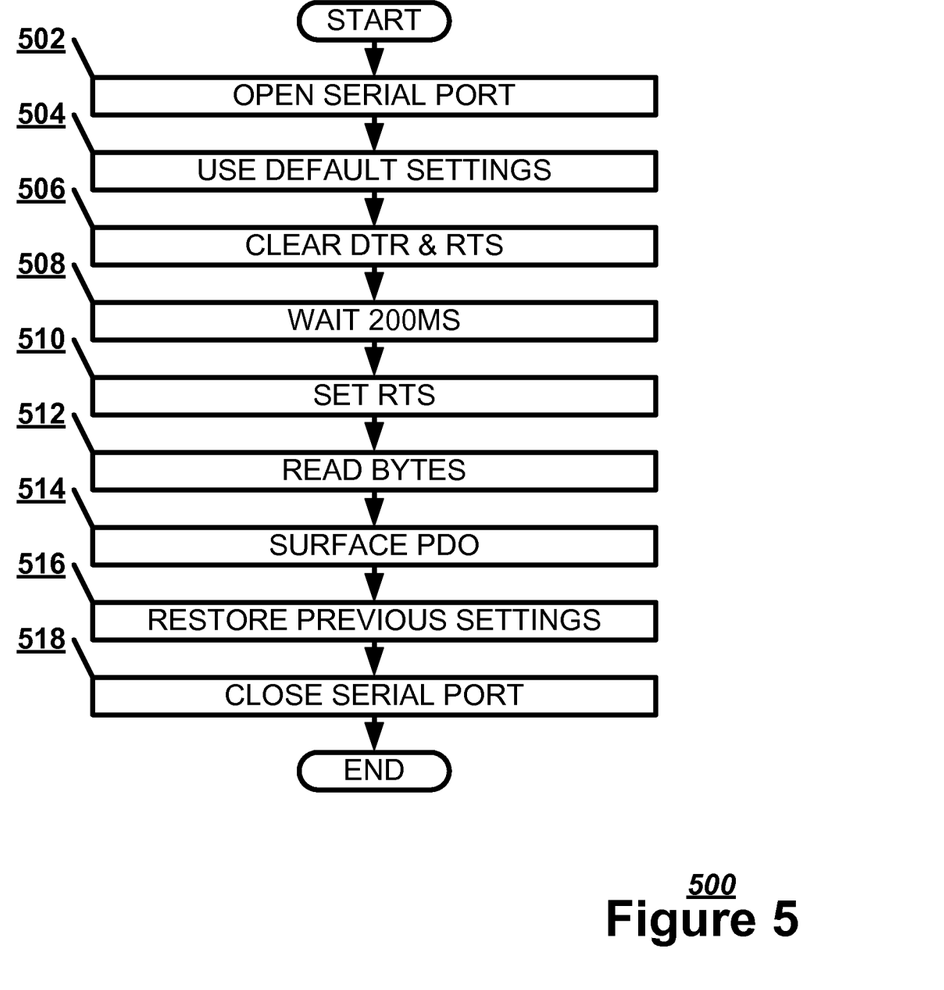
FIG. 5 illustrates, in a flowchart, an exemplary method of implementing an augmented serial device self-identification protocol.

FIG. 5 illustrates, in a flowchart, an exemplary method 500 of implementing the reception phase of an augmented serial device self-identification protocol. The serial enumerator may open a serial port (Block 502). The serial enumerator may use the default settings for the baud rate, the stop, the parity bit, and the word length (Block 504). The serial enumerator may clear the Data Terminal Ready signal and Request To Send signal (Block 506). The serial enumerator may wait the augmented protocol-designated wait period, such as 200 ms (Block 508). The serial enumerator may set the Ready To Send signal (Block 510). The serial enumerator may start reading the bytes from the serial port one at a time until the bytes are received (Block 512). The serial enumerator may surface the reading as an identifier of a physical data object (Block 514). The serial enumerator may restore the serial port to the previous settings (Block 516). The serial enumerator may close the serial port (Block 518).

Figure 6:
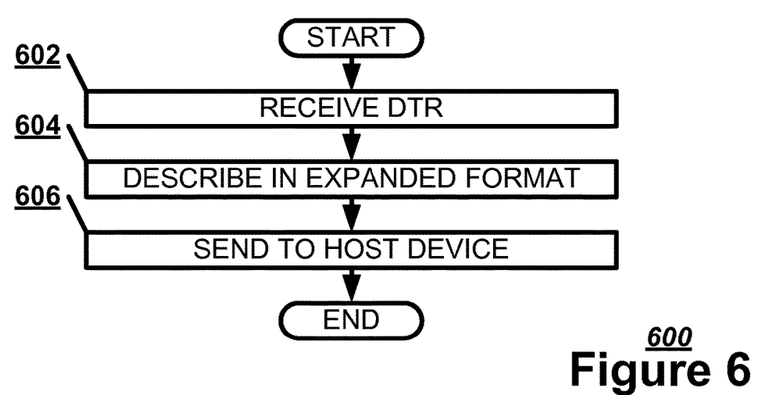
FIG. 6 illustrates, in a flowchart, an exemplary method of sending a serial device identifier from a serial device using an augmented serial device self-identification protocol.

FIG. 6 illustrates, in a flowchart, an exemplary method 600 of sending a serial device identifier from a serial device using an augmented serial device self-identification protocol. The serial device, such as the serial device 216, may receive a Data Ready to Send signal from a host device, such as the host device 202 (Block 602). For newer devices, the serial device may describe those devices in an expanded descriptor format for a serial device self-identification protocol in a serial device signal (Block 604). The serial device may send the serial device signal to the host device (Block 606).

Figure 7:
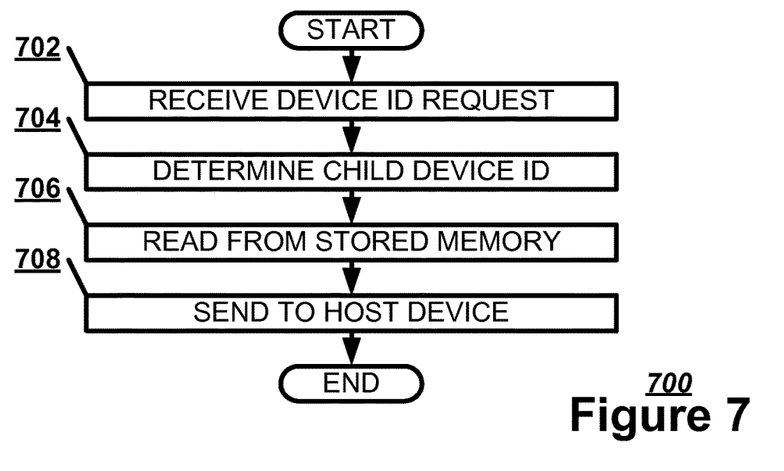
FIG. 7 illustrates, in a flowchart, an exemplary method of sending a child serial device identifier from a serial device bridge.

FIG. 7 illustrates, in a flowchart, an exemplary method 700 of sending a child serial device identifier from a serial device bridge. The serial device bridge, such as the serial device bridge 218, may receive a device identifier request from a host device, such as the host device 202 (Block 702). The serial device bridge may determine a child serial device identifier for a child serial device, such as child serial device 216, attached to the serial device bridge (Block 704). The serial device bridge may read the child serial device identifier from a bridge data storage (Block 706). The serial device bridge may send a serial device signal having the child serial device identifier to the host device (Block 708).

Figure 8:
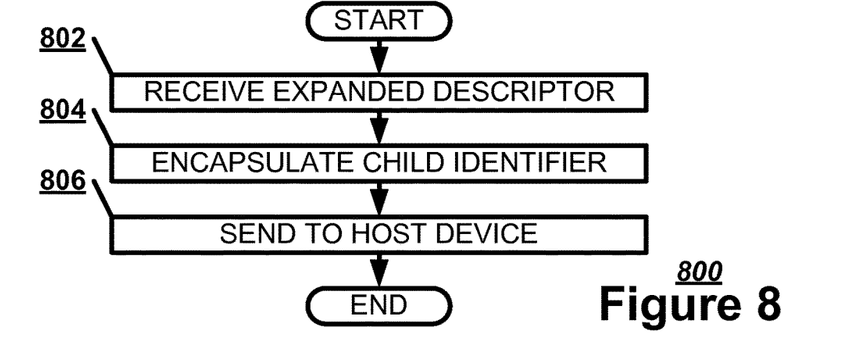
FIG. 8 illustrates, in a flowchart, an exemplary method of sending a child serial device identifier encapsulated by a serial device bridge.

FIG. 8 illustrates, in a flowchart, an exemplary method 800 of sending a child serial device identifier encapsulated by a serial device bridge. For newer devices, the serial device bridge may receive a child serial device identifier describing those devices in an expanded descriptor format for a serial device self-identification protocol (Block 802). The serial device bridge may encapsulate the child serial device identifier in a serial device signal (Block 804). The serial device bridge may send the serial device signal having the child serial device identifier to the host device (Block 806).

Figure 9:
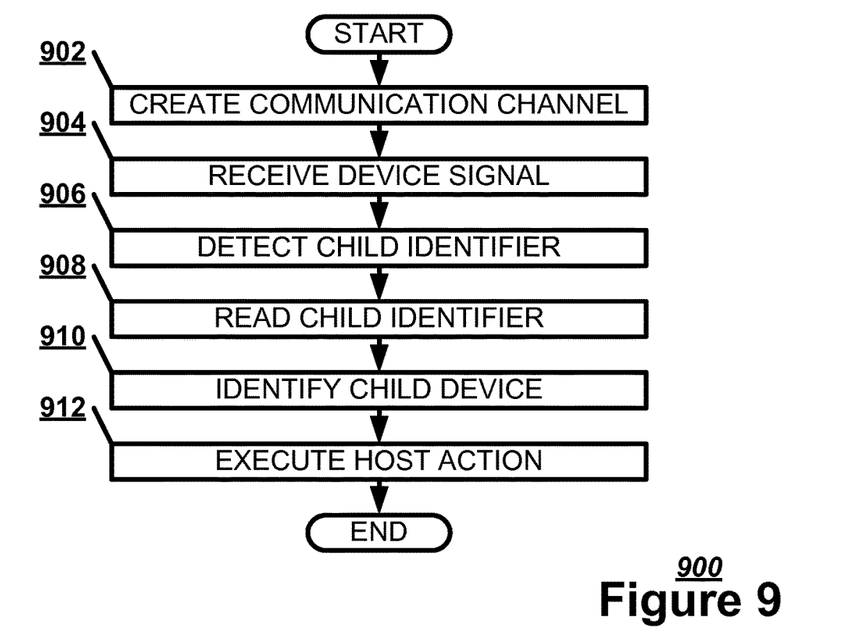
FIG. 9 illustrates, in a flowchart, an exemplary method of receiving in a host device a child serial device identifier from a serial device bridge.

FIG. 9 illustrates, in a flowchart, an exemplary method 900 of receiving in a host device a child serial device identifier from a serial device bridge. A host device 202, such as the host device 202, may create a communication channel with a serial device bridge, such as the serial device bridge 218, to receive the serial device signal on at least one of a universal serial bus channel, a Bluetooth® channel, or an Internet Protocol channel (Block 902). The host device 202 may receive a serial device signal having a child serial device identifier from a serial device bridge (Block 904). The host device may detect a child serial device identifier as determined by the serial device bridge (Block 906). The host device may detect the child serial device identifier stored in bridge data storage of the serial device bridge (Block 908). The host device 202 may identify the child serial device based on the child serial device identifier (Block 910). The host device 202 may execute a host action based on the child serial device 216 (Block 912).

Figure 10:
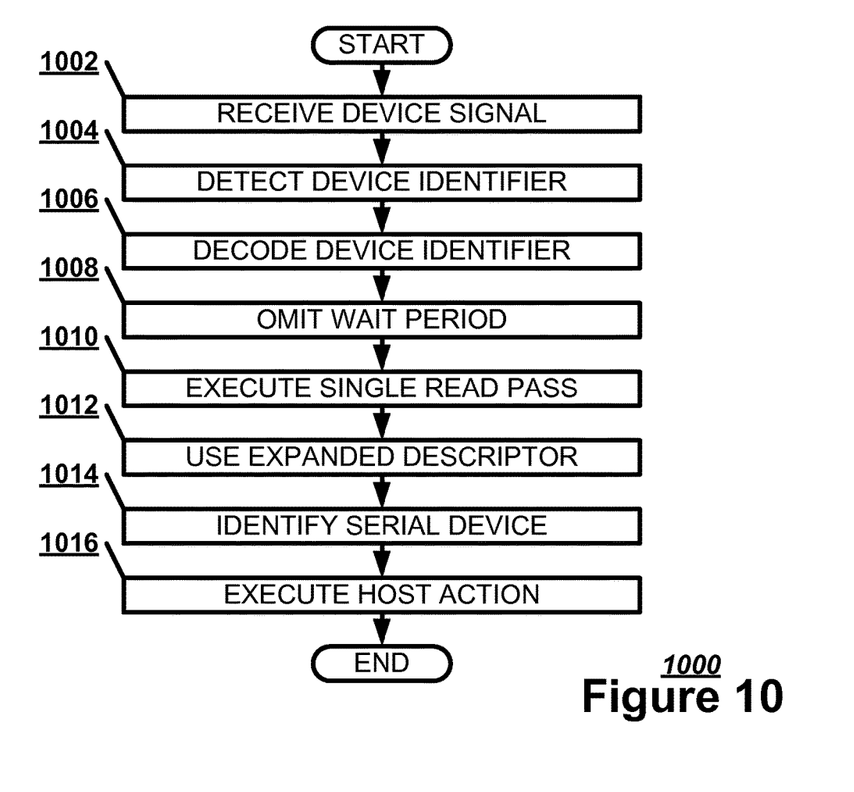
FIG. 10 illustrates, in a flowchart, an exemplary method of receiving in a host device a serial device identifier from a serial device.

FIG. 10 illustrates, in a flowchart, an exemplary method 1000 of receiving in a host device 202 a serial device identifier from a serial device 216. The host device, such as the host device 202, may receive a serial device signal encoded by a serial device, such as the serial device 216, with a serial device identifier in a serial device self-identification protocol (Block 1002). The host device may detect a serial device identifier in the serial device signal (Block 1004). The host device may decode the serial device identifier from the serial device signal using the serial device self-identification protocol (Block 1006). The host device may omit a wait period from an implementation of the serial device self-identification protocol (Block 1008). The host device may execute a reception phase of a serial device self-identification protocol as a single device read pass (Block 1010). The host device may use the expanded descriptor format to describe post-protocol devices with the serial device self-identification protocol to identify the serial device (Block 1012). The host device may identify the serial device based on the serial device identifier (Block 1014). The host device may execute a host action based on the serial device (Block 1016).

Figure 11:
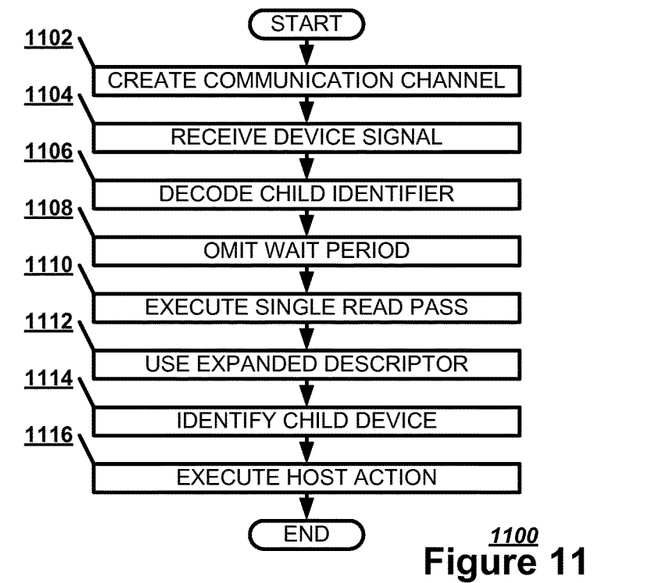
FIG. 11 illustrates, in a flowchart, an exemplary method of receiving in a host device a child serial device identifier encapsulated by a serial device bridge.

FIG. 11 illustrates, in a flowchart, an exemplary method 1100 of receiving in a host device a child serial device identifier encapsulated by a serial device bridge. The host device, such as the host device 202, may create a communication channel with a serial device bridge, such as the serial device bridge 218, to receive the serial device signal on at least one of a universal serial bus channel, a Bluetooth® channel, or an Internet Protocol channel (Block 1102). The host device may receive a serial device signal having a child serial device identifier form a serial device bridge (Block 1104). The host device may decode a child serial device identifier provided by the child serial device in an encapsulation by the serial device bridge according to a reception phase of a serial device self-identification protocol to transmit the child serial device identifier (Block 1106). The host device may omit a wait period from a reception phase of the serial device self-identification protocol (Block 1108). The host device may execute a reception phase of a serial device self-identification protocol as a single device read pass (Block 1110). The host device may use the expanded descriptor format to describe post-protocol devices with the serial device self-identification protocol to identify the child serial device (Block 1112). The host device may identify the child serial device based on the child serial device identifier (Block 1114). The host device may execute a host action based on the child serial device (Block 1116).

Figure 12:
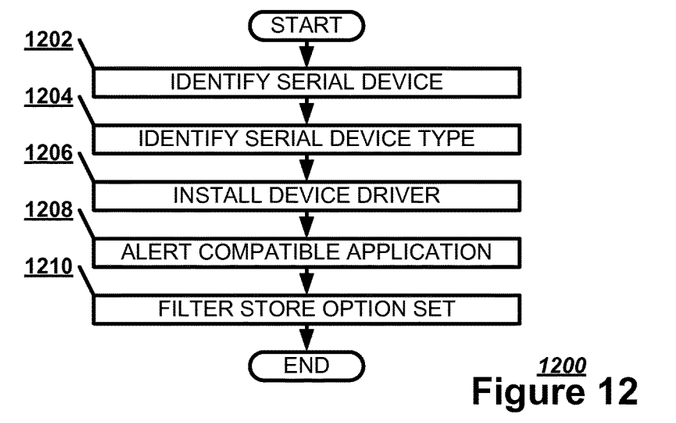
FIG. 12 illustrates, in a flowchart, an exemplary method of executing a host action with a host device.

FIG. 12 illustrates, in a flowchart, an exemplary method 1200 of executing a host action with a host device. The host device, such as the host device 202, may identify a child serial device, such as the child serial device 216, based on the child serial device identifier (Block 1202). The host device may identify a type for the child serial device 216, such as a mouse or a three-dimensional printer (Block 1204). The host device may install a child serial device driver based on the type of the child serial device 216 (Block 1206). The host device may alert a compatible application for the child serial device 216 (Block 1208). The host device may filter an application set presented by an application store based on the type of the child serial device (Block 1210).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving, by a host device, a serial device signal from a serial device bridge that converts serial device signals received from a child serial device into a format for a port of the host device;
decoding, by the host device, a child serial device identifier provided to the serial device bridge by the child serial device from the serial device signal;
identifying, by the host device, the child serial device based on the child serial device identifier; and
executing, by the host device, a host action based on the child serial device.

2. The method of claim 1, further comprising:
creating a communication channel with the serial device bridge to receive the serial device signal on at least one of a universal serial bus channel, a Bluetooth® channel, and an Internet Protocol channel.

3. The method of claim 1, wherein the host action includes:
installing a child serial device driver based on a type of the child serial device.

4. The method of claim 1, wherein the host action includes:
alerting a compatible application for the child serial device.

5. The method of claim 1, wherein the host action includes:
filtering an application set presented by an application store based on a type of the child serial device.

6. The method of claim 1, further comprising:
decoding, by the host device, the child serial device identifier provided by the child serial device to the serial device bridge and encapsulated in the serial device signal by the serial device bridge for transmission to the host device.

7. The method of claim 1, further comprising:
decoding, by the host device, the child serial device identifier from the serial device signal according to a reception phase of a serial device self-identification protocol to transmit the child serial device identifier.

8. The method of claim 1, further comprising:
omitting a wait period from the reception phase of a serial device self-identification protocol.

9. The method of claim 1, further comprising:
executing a reception phase of a serial device self-identification protocol as a single device read pass.

10. The method of claim 1, further comprising:
detecting the child serial device identifier as determined by the serial device bridge.

11. The method of claim 1, further comprising:
detecting a child serial device identifier stored in a bridge data storage of the serial device bridge.

12. A computing device having memory to store a set of instructions detailing a method stored thereon that when executed by a processing system having one or more processors cause the processing system to perform:
receiving a serial device signal encoded by a serial device with a serial device identifier in a serial device self-identification protocol;
executing a reception phase of a serial device self-identification protocol as a single device read pass;
identifying the serial device based on the serial device identifier; and
executing a host action based on the serial device.

13. The computing device of claim 12, wherein the method further comprises:
omitting a wait period from the reception phase of the serial device self-identification protocol.

14. The computing device of claim 12, wherein the method further comprises:
receiving the serial device signal from a serial device bridge that converts serial device signals received from the serial device into a format for a port of the computing device.

15. The computing device of claim 14, wherein the method further comprises:
creating a communication channel with the serial device bridge to receive the serial device signal on at least one of a universal serial bus channel, a Bluetooth® channel, and a WiFi® channel.

16. The computing device of claim 12, wherein the host action comprises:
installing a child serial device driver based on a type of the child serial device.

17. The computing device of claim 12, wherein the host action comprises:
alerting a compatible application for the child serial device.

18. The computing device of claim 12, wherein the host action comprises:
filtering an application set presented by an application store based on a type of the child serial device.

19. A serial device host system, comprising:
a universal serial bus port configured to receive a serial device signal from a serial device bridge that converts serial device signals received from a child serial device into a format for the universal serial bus port; and
a processor configured to decode a child serial device identifier provided to the serial device bridge by the child serial device from the serial device signal, to identify a child serial device based on the child serial device identifier, and to execute a host action based on the child serial device.

20. The serial device host system of claim 19, further comprising:
 a communication interface configured to receive an application set presented by an application store filtered based on the child serial device.

\* \* \* \* \*